United States Patent [19]

Pennington et al.

[11] Patent Number: 5,159,973

[45] Date of Patent: Nov. 3, 1992

[54] DUAL TEMPERATURE MAINTENANCE FOOD SERVING COMPARTMENT WITH PRE-COOLED COOLING MODULES AND HEAT STORAGE PELLETS

[75] Inventors: James Q. Pennington, Brentwood; Ray A. Story, Nashville, both of Tenn.

[73] Assignee: Plastics Manufacturing Co., Dallas, Tex.

[21] Appl. No.: 676,979

[22] Filed: Mar. 28, 1991

[51] Int. Cl.⁵ .......................................... F25B 29/00
[52] U.S. Cl. ........................... 165/48.1; 165/58; 165/918; 165/919; 312/236; 62/443; 62/371; 62/457.6; 126/400; 99/483; 99/448
[58] Field of Search ............... 165/58, 48.1, 918, 919; 312/236; 62/372, 371, 443, 457.6; 126/400; 99/483, 448

[56] References Cited

U.S. PATENT DOCUMENTS

| | | | |
|---|---|---|---|
| 439,958 | 11/1890 | Knight | 62/443 |
| 1,174,256 | 3/1916 | Klein | 62/443 |
| 1,677,454 | 7/1928 | Jones | 62/443 |
| 1,948,275 | 2/1934 | Miller | 62/443 |
| 1,979,222 | 10/1934 | Goodwin | 165/918 |
| 2,543,524 | 2/1951 | Oliveira | 165/918 |
| 3,160,452 | 12/1964 | Rothman | 165/919 |
| 3,199,579 | 8/1965 | Foster et al. | 165/48.1 |
| 3,205,033 | 9/1965 | Stentz | 165/48.1 |
| 3,222,114 | 12/1965 | Stentz | 312/236 |
| 3,275,393 | 9/1966 | Stentz et al. | 312/236 |
| 3,291,546 | 12/1966 | Traycoff | 312/236 |
| 3,389,946 | 6/1968 | Nicolaus et al. | 312/236 |
| 3,897,989 | 8/1975 | Grandi | 165/918 |
| 4,026,351 | 5/1977 | Biava | 165/58 |
| 4,156,456 | 5/1979 | Müller | 165/48.1 |
| 4,182,405 | 1/1980 | Hysen et al. | 165/48.1 |
| 4,936,377 | 6/1990 | DeVogel et al. | 165/919 |

OTHER PUBLICATIONS

Max Temp System 45° Therma-Tray Corp. 801 Montrose Ave. So. Plainfield, N.J. 07080, (no date).

*Primary Examiner*—John K. Ford

[57] ABSTRACT

An improved food serving cart of the type having a compartment for holding multiple trays of prepared foods having both hot and cold food and/or beverage portions thereon, the improvement including a vertically disposed cold reservoir for holding replaceable cooling modules, and multiple food tray holding racks attached inside the cart in a vertical column horizontally adjacent to and in thermal communication with the vertically disposed cold reservoir such that a first portion of each of the horizontal racks is in close proximity to the cooling modules and constitutes a cold zone and a second portion of each of the horizontal racks in spatially separated from the vertical cold reservoir and constitutes a hot zone.

8 Claims, 2 Drawing Sheets

DUAL TEMPERATURE MAINTENANCE FOOD SERVING COMPARTMENT WITH PRE-COOLED COOLING MODULES AND HEAT STORAGE PELLETS

FIELD OF THE INVENTION

The present invention relates to food serving carts for transporting prepared food, and in particular, to an improved food serving cart having racks therein for holding food serving trays and having hot zones and cold zones spatially separated such that complete prepared meals which include a hot entree portion, cool desert, salad, and/or beverage portion(s), can be held in said cart to maintain the differential temperature between the various portions of the meal.

Serving carts of the type having racks for holding multiple food trays and for transporting the food from place to place during serving have previously been known. However, prior serving carts which provided for keeping part of the food hot and part of the food cold had various drawbacks. For example, some carts included electrical heating units and refrigeration units which required the carts to be plugged into an electrical power source. These devices also required specially constructed trays having either a raised hump or a slot therethrough for straddling a fixed barrier between the electrically heated side of the cart and the refrigeration unit on the other side.

Another system for keeping the food at different temperatures required not only separate heated pellets for the entree but also special cold storage pellets to be placed on each tray. Placement of the special cold storage pellets on each tray is time consuming and requires special attention to cooling a large number of such special cold storage pellets prior to each use of the serving cart.

SUMMARY OF THE INVENTION

The present invention overcomes these and other drawbacks of prior serving carts by providing a serving cart having multiple serving tray racks therein and including a cold reservoir for holding pre-cooled modules, a cold zone adjacent thereto, and a hot zone spatially separated from the cold reservoir and maintained hot using hot pellets for hot food dishes. The cold zone is maintained at a cool temperature using fewer replaceable cold storage modules than the total number of trays to be held in the serving cart. The replaceable cold modules may, for example, be previously cooled or frozen plastic bottles filled with a eutectic gel which bottles are durable, reusable, and sized to be inserted and held in the reservoir. Each of the serving trays need not be specially designed but is simply arranged for holding a hot plate or hot dish at one end and for holding cold food and/or beverages at the other end. Each of the cold ends of the serving trays are positioned immediately adjacent the eutectic module in the cold reservoir and therefore remains in the cold zone of the serving cart until served. The eutectic cold material absorbs heat most rapidly from the immediately adjacent food items on the trays. The heat transfer or cooling effect is substantially reduced as the distance from the cold reservoir increases. Thus, the cooling effect extends partially through the cold zone but does not have any substantial cooling effect in the hot zone. The hot zone results from using heated food plates or dishes or heated pellets onto which the food plates or dishes are placed. Typically, the dish is also fitted with an insulated or heat shielding cover or lid. To further facilitate the separation of the cold zone from the hot zone, a thermal insulating barrier is held above the tray and interposed in between the hot zone and the cold zone.

Advantageously, a central cold reservoir is constructed between two opposed columns of food tray holding racks so that two cold zones and two hot zones are formed for each reservoir. Also, the trays fit in the racks extending substantially across the interior of the cart to form closed shelves so that convection from one tray to the next is reduced.

BRIEF DESCRIPTION OF THE DRAWINGS

These and other objects and advantages of the present invention can be seen with reference to the drawings in which like numerals represent like elements, and in which.

DETAILED DESCRIPTION OF THE PREFERRED EMBODIMENTS

Figure 1:
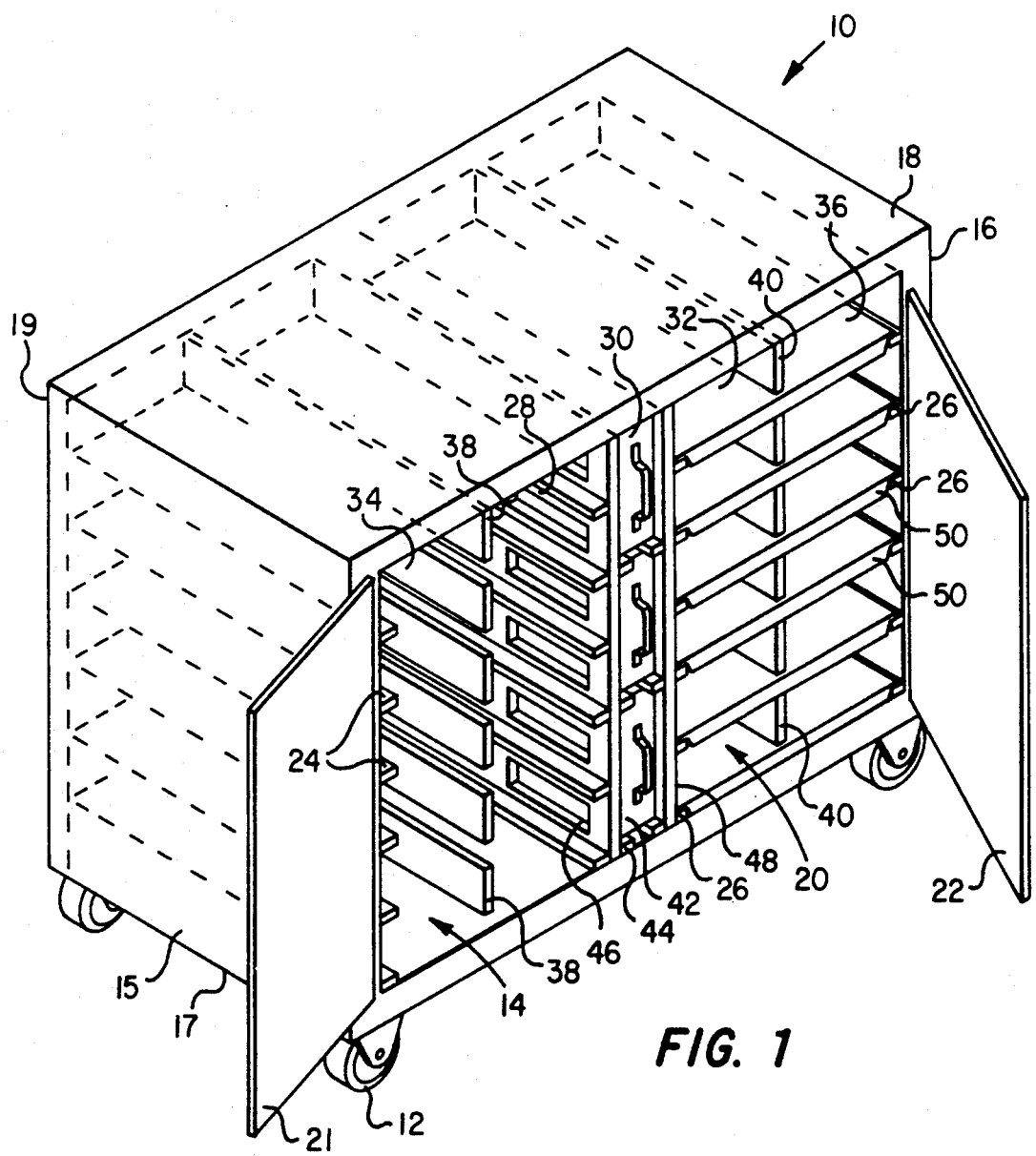
FIG. 1 is a perspective view of the dual temperature food zone serving cart of the present invention with food serving trays removed in front and with trays shown in place in the back of the compartment.

Referring to FIG. 1, which is a perspective view of the inventive dual temperature zone serving cart 10, it will be observed that the cart 10 is provided with locomotion means 12 which may be wheels or casters or other appropriate means for transporting the cart from one location to the next for serving food which is carried in an interior food carrying compartment 14. The compartment 14 may be formed with a front wall 15, back wall 16, bottom 17, top 18, and side 19; each of which walls, top, bottom, and side, are shown with thermal insulation to reduce the effect of exterior temperature on the food carried within the compartment. However, a lightweight single panel construction advantageously can be used to reduce the total weight of the cart and to reduce material cost without substantial reduction in the effectiveness of the cart where the hot and cold zones are otherwise maintained according to the invention. There is an entry opening 20 for inserting and removing food trays, which opening 20 may optionally be fitted with doors 21 and 22. Alternatively, for example, opening 20 may be closable using a flexible sliding or rolling cover which can be pulled back and forth across the opening 20.

Compartment 14 is fitted with front tray holding racks 24 in a vertical spaced apart column toward front wall 15 of the cart and back tray holding racks 26 in a vertical column toward the back 16 of the cart. Each of the tray holding racks 24 and 26 may be formed with horizontally opposed strips of material projecting perpendicularly from the front wall 15 and from a wall of reservoir 30, respectively. Alternatively, the racks 24 and 26 may be formed of sheets of material suspended from the front wall 15, side wall 19, and back wall 16, and horizontally disposed in the vertical columns in compartment 14. Preferably each rack 26 or 24 will be traversed by the tray itself or by a solid sheet of material to form a shelf completely extending between the walls and entry opening 20 so that convective air flow and heat transfer between the racks 26 or 24 is reduced when food is in place prior to serving.

According to the present invention, each of the tray holding racks holds each tray at least partially in either a front cold zone 28 or a back cold zone 32 and also in either a front hot zone 34 or a back hot zone 36. The cold zone is formed with a vertically disposed cold reservoir 30 which is interposed between the adjacent front cold zone 28 and the adjacent back cold zone 32. The front hot zone 34 is formed a distance away from the cold reservoir column 30 such that heat energy is not easily transmitted from the hot zone 34 to the cold reservoir 30. Likewise, the back hot zone 36 is in the opposite direction a distance away from cold reservoir 30 such that the communication of heat between each of the hot zones 36 is reduced due to the separation distance. The separation distance in each case corresponds to cold zone 28 and cold zone 32, respectively. To further reduce the heat communication between the hot zones 34 and 36 and cold zones 28 and 32, a shield 38 may be disposed between cold zone 28 and hot zone 34 and a shield 40 may be disposed between cold zone 32 and hot zone 36 for each of the food tray racks 24 and 26, respectively. Each of the shields 38 and 40 preferably extend from side wall 19 to opening 20 and are suspended or spaced above each of racks 24 and 26 so that a food serving tray 50 may be inserted thereunder. It has been discovered that with the unique use of hot pellets under covered hot dishes and a cold reservoir formed with eutectic modules adjacent to the cold zone, the barrier is no longer essential and further weight reduction and material cost can be achieved by removing the barriers.

The cold reservoir 30 is constructed with means 44 for replaceably holding cold storage modules 42. The storage modules 42 can be in the form of self-contained bricks of eutectic material and are preferably rectangular plastic bottles filled with eutectic gel which can be pre-cooled or frozen for insertion into the cold storage holding means 44. It will be seen that in FIG. 1 multiple flat modules 42 are held vertically disposed in cold reservoir 30 to advantageously permit the use of conveniently sized cold storage modules which can be quickly cooled for use in the serving cart. The adjacent location allows any convective currents within each tray to carry the cold air downward over the cold food and beverages which increases the cooling effectiveness in the cold zone, unlike devices which use individual flat cold pellets under the cold food on each tray. Further advantages are obtained because there are fewer cold modules than trays such that each module cools multiple trays.

After the serving cart is used to make deliveries of the food, the modules 42 can be conveniently and quickly removed for re-cooling and then reinserted for reuse of the food serving cart. From the cold zones 28 and 32 heat is transferred through front thermal transfer wall 46 and through back thermal transfer wall 48; thereby maintaining a low temperature in the cold zones 28 and 32, respectively.

Figure 2:
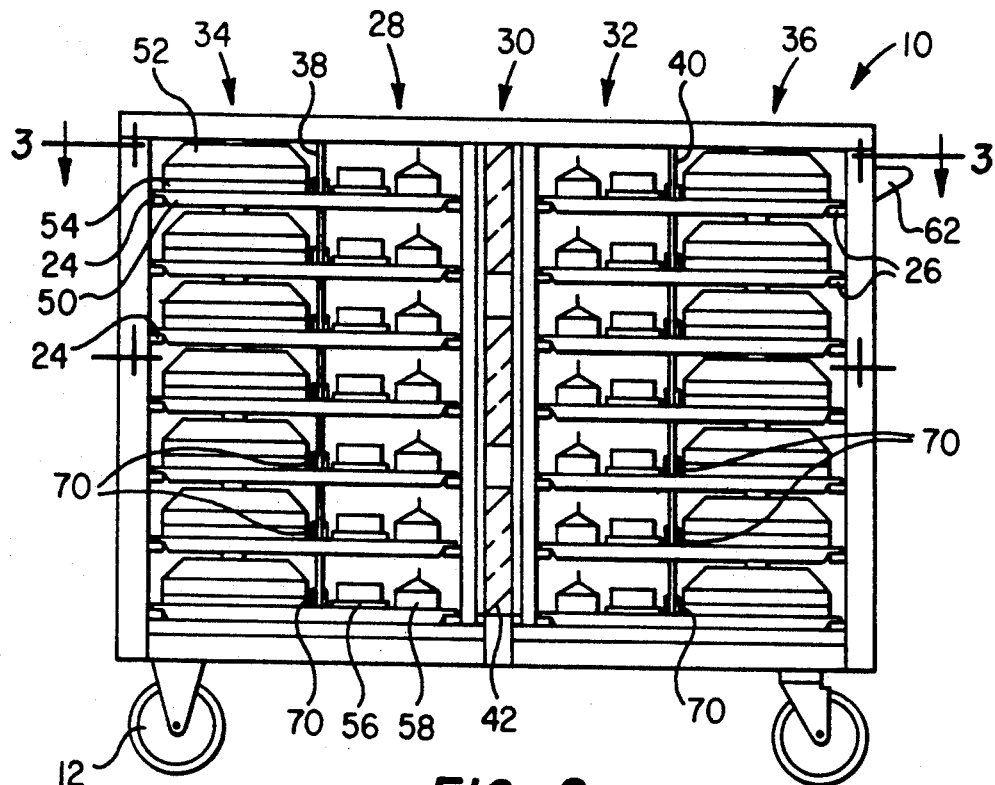
FIG. 2 is a side plan view of the dual temperature zone serving cart of the present invention with loaded serving trays and eutectic modules shown in place therein.
Figure 3:
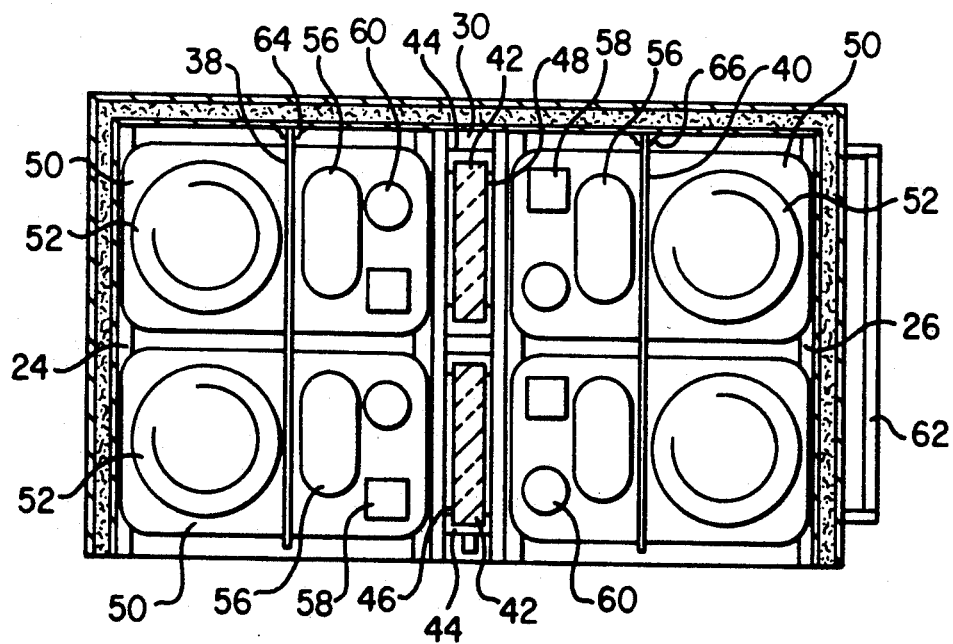
FIG. 3 is a top cross section view taken along line 3—3 of FIG. 2 further depicting the advantageous construction of the inventive cold and hot zoned food serving cart with trays shown arranged therein.

With reference to FIGS. 2 and 3, in which FIG. 2 is a side plan view of the inventive food serving cart 10 and in which FIG. 3 is a cross section top view taken along section line 3—3 of FIG. 2, the construction and use of the inventive food serving cart can be more fully understood. Serving trays 50 are inserted horizontally onto tray holding racks 24 and 26. The serving trays 50 are consistently arranged with a hot entree dish 52 at one end and with cold food and beverage sections 56, 58, and 60 at the other end. The trays may be stacked in vertical columns several layers high and may also be inserted so that more than one tray is carried on each rack 24 and 26. When the tray 50 is on front rack 24, the cold food is adjacent cold reservoir 30. The effect of the cold modules 42 on the food trays extends outwardly from modules 42 through thermal conduction means 46 and 48. The conduction means may be open areas adjacent the modules which are replaceably held at 44, may be perforated walls or may be thin sheets of thermal conducting materials.

In the case of the trays 50 on back rack 26, again, the trays are turned so that the hot entree serving dish 52 is spaced a distance away from cold reservoir 30 in hot zone 36. Cold food and beverage areas 56, 58, and 60 are immediately adjacent the cold reservoir 30 in cold zone 32. The front hot zone 34 and cold zone 28 may be advantageously separated with a shield 38 and back cold zone 32 and hot zone 36 may be advantageously separated with shield 40.

A shield 38 may be used for each of front racks 24 and a shield 40 may be used for each of rear racks 26. The shields may be affixed in cantilever fashion at front mounting means 64 and back mounting means 66 attached to the inside of side wall 19. The shields 38 an 40 are constructed so that trays 50 can be inserted there below without special tray construction. This insertion can be permitted, for example, by having a flexible member 70 attached to the bottom of rigid cantilevered shields 38 and 40 which are spaced above each rack 24 and 26. Alternatively the shields could be suspended from the underside of top 18 and from the underside of each successive rack 24 and 26 to just above each subsequent tray holding rack. The of top 18 and from the underside of each successive rack 24 and 26 to just above each subsequent tray holding rack. The shields may also be made of a flexible material suspended such that the trays can be inserted there through without substantial obstruction.

While the invention has been described in connection with preferred embodiments, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An improved food serving cart of the type having a generally rectangular geometrical shape with a compartment therein for holding multiple trays of prepared foods having both hot and cold food and/or beverage portions thereon, said improvement comprising:
    (a) a vertically disposed cold reservoir for replaceably holding non-mechanical pre-cooled cooling modules; said vertically disposed cold reservoir dividing said compartment into a plurality of sub-compartments, each said sub-compartment having a cold zone contiguous to said cold reservoir and a hot zone spaced from said cold reservoir by said cold zone;
    (b) a plurality of non-mechanical cooling modules in said cold reservoir;

(c) multiple food tray holding racks attached inside said cart in at least one of said sub-compartments in a vertical column horizontally adjacent to and in thermal communication with said vertically disposed cold reservoir such that a first portion of said horizontal racks is in close proximity to said cooling modules and within said cold zone, and a second portion of said horizontal racks is spatially separated from said cold reservoir and is positioned within said hot zone, and (d) a plurality of heat storage pellets disposed within said hot zone and displaced spatially from said cold zone.

2. An improved food serving cart, as in claim 1, further comprising:

(a) food serving trays sized for insertion into said food tray holding racks; and (b) means on said food serving trays adapted for holding at least some of said heat storage pellets spaced apart from said cold reservoir in said hot zone to thereby maintain said hot zone and food on said trays in said hot zone at a sufficiently elevated temperature for improved palatability.

3. An improved food serving cart, as in claim 2, wherein each of said heat storage pellets is sized substantially flat corresponding to the bottom of a food serving dish and fits there under without raising said dish into conflict with the top of the compartment or with a rack there above and so that heat is transferred efficiently upward through said food dish there above.

4. An improved food serving cart, as in claim 1, wherein:

(a) said vertically disposed cold reservoir for holding said pre-cooled cooling modules comprises a narrow centrally located column of cooling module holding means; and (b) said vertical column of food tray holding racks comprises a first vertical column of food tray holding racks adjacent said cold reservoir in one horizontal direction from said cold reservoir and a second vertical column of food tray holding racks in the opposite horizontal direction from said cold reservoir, such that said cold zone is formed at each of said racks in adjacent proximity to said central vertical cold reservoir and said hot zone is formed at each of said racks at a horizontally separated distance from said cold reservoir.

5. An improved food serving cart, as in claim 4, wherein each of said racks is constructed to hold trays so as to form a substantially solid shelf of horizontally disposed material extending from said central reservoir to the inside walls of said compartment of said serving cart, such that convective air flow from one rack to the next is reduced.

6. An improved food serving cart, as in claim 1, further comprising a cold shield suspended above each of said food tray holding racks between said cold zone and said hot zone.

7. An improved food serving cart, as in claim 1, further comprising:

(a) air flow blocking walls surrounding said compartment from top, bottom, front, back, and one side for blocking air flow into said compartment; and (b) an entry opening at another side of said compartment for inserting and extracting food serving trays in to and out of said racks.

8. An improved food serving cart, as in claim 7, further comprising means for selectively opening and closing said entry opening at said other side of said compartment to insert and remove food trays therefrom and to reduce the temperature exchange with the surroundings when trays are not being inserted or removed.

* * * * *